(12) United States Patent
Pederson

(10) Patent No.: US 8,087,896 B2
(45) Date of Patent: *Jan. 3, 2012

(54) HANDLING SYSTEM FOR A WIND TURBINE NACELLE, METHOD FOR VERTICAL DISPLACEMENT AND A WIND TURBINE NACELLE AND A WIND TURBINE NACELLE

(75) Inventor: Gunnar Kamp Storgaard Pederson, Skjern (DK)

(73) Assignee: Vestas Wind Systems A/S, Aarhus N (DK)

( * ) Notice: Subject to any disclaimer, the term of this patent is extended or adjusted under 35 U.S.C. 154(b) by 530 days.

This patent is subject to a terminal disclaimer.

(21) Appl. No.: 12/306,584

(22) PCT Filed: Jun. 29, 2007

(86) PCT No.: PCT/DK2007/000322
§ 371 (c)(1),
(2), (4) Date: Dec. 24, 2008

(87) PCT Pub. No.: WO2008/000267
PCT Pub. Date: Jan. 3, 2008

(65) Prior Publication Data
US 2009/0280010 A1    Nov. 12, 2009

(30) Foreign Application Priority Data

Jun. 29, 2006  (DK) .................................. 2006 00874

(51) Int. Cl.
*F03D 11/04*    (2006.01)
(52) U.S. Cl. ................. 416/132 B; 416/244 R; 415/232; 290/55
(58) Field of Classification Search .................. 415/232; 416/63, 132 R, 132 B, 133
See application file for complete search history.

(56) References Cited

U.S. PATENT DOCUMENTS
3,289,868 A    12/1966  Miller et al.

FOREIGN PATENT DOCUMENTS
| RU | 2 075 643 | 3/1997 |
| WO | WO03/071130 | 8/2003 |
| WO | WO03/100248 | 12/2003 |
| WO | WO2004/101313 | 11/2004 |

*Primary Examiner* — Stephen W Smoot
(74) *Attorney, Agent, or Firm* — Wood, Herron & Evans, L.L.P.

(57) ABSTRACT

A handling system for a wind turbine nacelle in connection with self-loading or self-unloading of the nacelle to or from a vehicle. The system uses two or more lifting apparatus, where the lifting apparatus are engaged with lifting areas of a load carrying structure of the nacelle. The lifting areas are a part of the load carrying structure or are integrated in the load carrying structure, and where the lifting apparatus lifts by applying linear force to the load carrying structure of the nacelle. A method is also provided for vertical displacement of a wind turbine nacelle and a wind turbine nacelle prepared for self-loading or self-unloading to or from a vehicle.

17 Claims, 5 Drawing Sheets

HANDLING SYSTEM FOR A WIND TURBINE NACELLE, METHOD FOR VERTICAL DISPLACEMENT AND A WIND TURBINE NACELLE AND A WIND TURBINE NACELLE

PRIORITY CLAIM

This is a U.S. national stage of application No. PCT/DK2007/000322, filed on Jun. 29, 2007. Priority is claimed on the following application(s): Country: Denmark, Application No.: PA200600874, Filed: Jun. 29, 2006, the content of which is incorporated here by reference.

BACKGROUND OF THE INVENTION

The invention relates to a handling system for a wind turbine nacelle in connection with self-loading or self-unloading of said nacelle to or from a vehicle, a method for vertical displacement of a wind turbine nacelle and a wind turbine nacelle prepared for self-loading or unloading from a vehicle.

DESCRIPTION OF THE RELATED ART

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front.

As large modern wind turbines gets bigger and bigger the transportation and general handling of the different wind turbine parts becomes an increasing problem. Particularly the nacelle, which most often is big as a house and can weigh up to 100 metric ton, can be difficult to handle and transport. The components of the nacelle could of course be transported separately and then assembled at the erection site but most of the nacelle equipment is highly complicated and the interaction between the components is complex, making it highly inefficient to assemble it at the erection site. It is therefore advantageous that particularly the nacelle is fitted under controlled circumstances and that this assembly is done by experts to reduce the risk of very costly breakdowns.

A number of different means and methods have therefore been suggested over the time on how to transport and handle wind turbine nacelles—particularly from the manufacturing plant to the erection site. One example is disclosed in international patent application WO 03/071130 A1 where a nacelle with the rotor hub mounted is suspended between truck and a trailer during the transport. The truck and trailer can load and unload the nacelle directly from and to the ground, by raising and lowering the wheels of the trailer and by means of special lifting equipment on the truck.

It is of course advantageous that the truck and trailer is capable of loading and unloading the nacelle without the use of additional lifting equipment, but this method has its limitations in the fact, that the nacelle has to be self-sustaining in its entire length, the hub has to be mounted on the nacelle hereby adding additional length to an already long nacelle, the hub has to be able to carry substantially the entire weight of the nacelle and in that the truck has to be special fitted with the lifting means.

The object of the invention is therefore to provide for a technique for handling wind turbine nacelles without the above mentioned disadvantages.

Especially it is an object of the invention to provide for a simple and advantageous handling technique and a nacelle adapted for this purpose.

SUMMARY OF THE INVENTION

The invention provides for a handling system for a wind turbine nacelle in connection with self-loading or self-unloading of the nacelle to or from a vehicle. The system comprises two or more lifting means, where the lifting means are engaged with lifting areas of a load carrying structure of the nacelle. The lifting areas are a part of the load carrying structure or are integrated in the load carrying structure, and where the lifting means lifts by applying linear force to the load carrying structure of the nacelle.

E.g. when a nacelle has to be transported from a manufacturing plant located in Europe to an erection site in Australia, the nacelle is transported to a harbour where it is loaded onto a ship, which sails it to Australia. In most areas of Australia there are no height limitations of vehicles travelling the roads, making it possible to transport the nacelle from the harbour to the erection site on top of the platform body of a standard heavy duty trailer pulled by a large standard truck. But since the nacelle weighs as much as 100,000 kilograms it takes a very large crane to handle the nacelle at the harbour and to load and unload it from the trailer. Having to transport such a crane to the erection site to unload the nacelle would be very expensive and disadvantageous. A truck and trailer comprising special lifting equipment could of course be used but since this vehicle is special made to this specific task, it would have to follow the nacelle during the entire trip, which would be both unpractical and expensive.

A handling system which enables that the nacelle can load and unload itself from a vehicle is therefore advantageous, in that no further lifting equipment would be needed when loading and unloading the nacelle to and from a transportation vehicle.

Furthermore, it is advantageous that the lifting means lifts and lowers the nacelle by applying linear force to the load carrying structure of the nacelle, it that this provide for a less stressful way of displacing the nacelle vertically, making it possible to design the load carrying structure more simple and reduce its ability to withstand pressure or other stresses e.g. applied in the longitudinal direction of the nacelle, hereby reducing the overall cost of the nacelle.

In an aspect of the invention, said two or more lifting means comprise at least three individual adjustable lifting means.

It is hard to maintain the balance of a heavy object standing on two "legs". Making the handling system comprise three individual adjustable lifting means engaged with the nacelle is therefore advantageous, in that it provides for a steady and stable system and the nacelle will never wobble no matter how uneven the ground is when supported by three "legs".

In an aspect of the invention, said two or more lifting means comprise means for vertical displacement of said lifting areas.

Hereby is achieved an advantageous embodiment of the invention.

In an aspect of the invention, said two or more lifting means comprise one or more hydraulic cylinders.

A hydraulic cylinder is capable of lifting a relatively great load compared to its size, which is advantageous, in that these hydraulic cylinders most often would have to travel with the nacelle, hereby reducing the space needed and the weight of the transported load.

In an aspect of the invention, said lifting areas are integrated in a bottom structure of said load carrying structure such as in the nacelle bed frame.

Most nacelles are already designed with at very strong bottom structure of the load carrying structure and it is therefore advantageous to use lifting areas on this bottom structure as points of attack when lifting or lowering the nacelle. Substantially no or very little redesigning of the load carrying structure would be needed to adapt a nacelle to the described handling system.

In an aspect of the invention, said lifting areas are positioned substantially symmetrically on said load carrying structure.

The load from the components inside the nacelle is substantially symmetrically distributed in the nacelle and the load carrying structures strength and ability to carry this load is therefore also substantially symmetrically distributed and it is therefore also advantageous to position the lifting areas substantially symmetrically on the load carrying structure.

In an aspect of the invention, said lifting areas are established in the longitudinal sides of said nacelle.

By establishing the lifting areas in the longitudinal sides of the nacelle it is possible to bring the lifting means so far out to the sides that it is possible to position a trailer under the nacelle while the lifting means lifts the nacelle.

Furthermore, the nacelle is much longer than it is wide and a lifted nacelle is therefore more stable if it is lifted at the sides than at the ends.

Even further this position provides free access to the ends of the nacelle e.g. for connecting the lifted nacelle to a truck and trailer.

In an aspect of the invention, said lifting areas are established in relation to the weight distribution of said nacelle providing substantially uniform load on each of said two or more lifting means when self-loading or unloading.

If the load on each lifting mean are substantially the same when lifting the nacelle, the lifting means can be made identically. Especially regarding manufacturing costs, spare parts and other it is advantageous that the lifting means are substantially uniform.

In an aspect of the invention, said load carrying structure are configured for carrying the entire weight of said nacelle and nacelle components mounted in said nacelle such as generator, gear, bearings, control cupboards and/or inverters.

Hereby is achieved an advantageous embodiment of the invention.

In an aspect of the invention, said two or more lifting means are detachable.

Making the lifting means detachable is advantageous in that it enables that the same lifting means can be used to lift different nacelles and in that the nacelles weight is reduced when mounted on the wind turbine tower.

In an aspect of the invention, said two or more lifting means comprise engaging members being engaged with said lifting areas, said engaging members comprising means for transferring torque to said lifting areas in a longitudinal direction of said nacelle.

By making the engaging members of the lifting means able to transfer torque to the nacelle in the longitudinal direction of the nacelle it is possible to ensure that the nacelle or more correctly the lifting means does not overturn during the lifting procedure. In praxis this could be done by forming the engaging members as e.g. rectangular tubes substantially tightly fitting a corresponding cavity in the load carrying structure, making it impossible for the engaging members to rotate in the cavities defining the lifting areas. In fact this could substantially be archived by making the engaging members and corresponding lifting areas any other shape than round.

A method is further provided for transport of a wind turbine nacelle. The method comprises the steps of
engaging two or more lifting means with lifting areas in a load carrying structure of said nacelle, and
vertically displacing said nacelle by applying linear force to said load carrying structure of the nacelle by means of said lifting means.

This method is advantageous, in that it hereby is possible to lift the nacelle without the need of expensive cranes or special made and expensive truck lifting equipment and without stressing the load carrying structure by applying loads in undesired directions through the structure.

In an aspect of the invention, said two or more lifting means are at least three individual adjustable lifting means engaging at least three separate lifting areas.

In an aspect of the invention, said lifting means are hydraulic cylinders vertically displacing said nacelle substantially proportional with the extension or extraction of a piston of said hydraulic cylinders.

Making the nacelle travel the same length as the piston is extended from the cylinder is advantageous, in that this provides for a more efficient and direct way of lifting the nacelle, and in that this method ensures that the nacelle is not stressed by forces in undesired directions.

In an aspect of the invention, said method further comprises the step of placing a transport vehicle beneath said nacelle when said two or more lifting means have lifted said nacelle free of an underlying surface.

The load carrying structure of the nacelle is typically placed at or near the outer periphery of the nacelle and the lifting means does therefore engage the nacelle at the periphery. This leaves room for positioning a transport vehicle such as a flatbed truck beneath the nacelle when it is lifted.

In an aspect of the invention, said method further comprises the step retracting said two or more lifting means when said transport vehicle is placed beneath said nacelle to place said nacelle on said transport vehicle.

In an aspect of the invention, said method further comprises the step detaching at least one of said two or more lifting means from said nacelle when said nacelle is placed on said transport vehicle.

Detaching the lifting means from the transport vehicle before the transport starts is advantageous in that this will reduce the width of the transported load whereby enabling as smoother transport and transport on more roads.

Even further the invention provides for a wind turbine nacelle prepared for self-loading or unloading from a vehicle. The nacelle comprises a load carrying structure, and handling openings in the nacelle cover for establishing exterior access to the load carrying structure for a handling system for a nacelle. The nacelle is characterized in that, the handling openings being established in the longitudinal sides of the nacelle.

The nacelle is longer than it is wide and establishing handling openings for establishing exterior access to the load carrying structure in the longitudinal sides of the nacelle is advantageous, in that—even though this does not exclude openings in the ends of the nacelle—it hereby is possible to lift the nacelle in a more stable way.

Furthermore, enabling that the nacelle can be lifted at the sides is load and stress distribution-wise more advantageous, in that lifting points or areas can be moved to a more optimal position regarding stress distribution in the load carrying structure—especially compared to lifting the nacelle in the ends. This nacelle design would enable that a nacelle could be lifted even though it was not self-supporting in its entire length.

It should be emphasised that by the term "sides", is to be understood the substantially vertical sides facing sideward during normal operation of the nacelle when mounted on an erected wind turbine.

In an aspect of the invention, wherein a first longitudinal side comprise at least one handling opening and a second longitudinal side comprise at least one further handling opening.

Placing at least one handling opening on one side of the nacelle and at least one further handling opening on the opposite side of the nacelle is advantageous—particularly regarding load distribution and stability.

In an aspect of the invention, said handling openings in said first longitudinal side and said further handling openings in said second longitudinal side are positioned substantially directly opposite each other.

This design provides for a further advantageous embodiment—particularly regarding load distribution and stability.

BRIEF DESCRIPTION OF THE DRAWINGS

The invention will be described in the following with reference to the figures in which.

DETAILED DESCRIPTION OF THE PRESENTLY PREFERRED EMBODIMENTS

Figure 1:
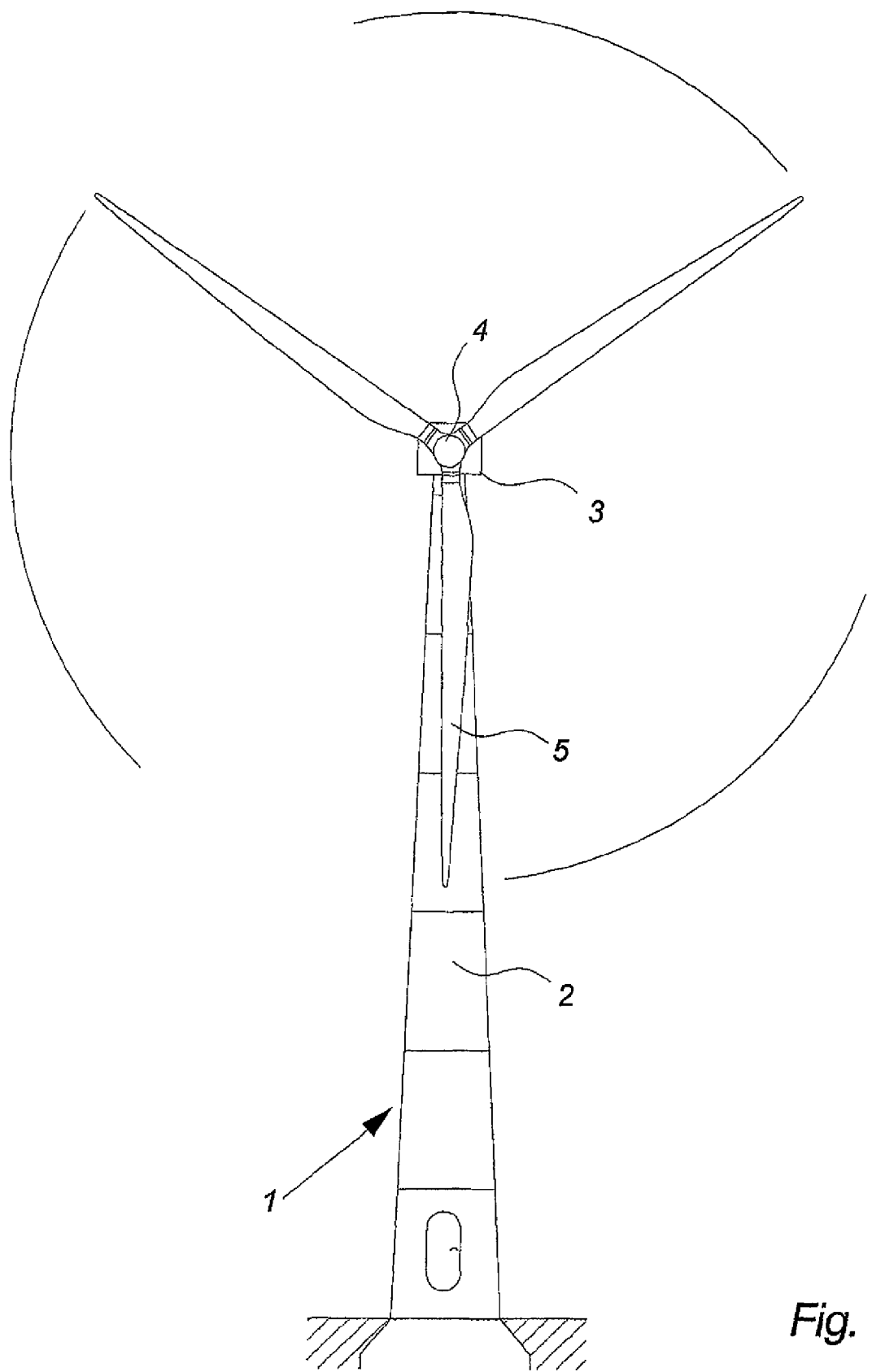
FIG. 1 illustrates a wind turbine according to one embodiment, as seen from the front.

FIG. 1 illustrates a wind turbine 1 according to one embodiment of the invention, comprising a tower 2 placed on a foundation and a wind turbine nacelle 3 positioned on top of the tower 2. The wind turbine rotor 4, comprising three wind turbine blades 5, is connected to the nacelle 3 through the low speed shaft which extends out of the nacelle 3 front.

Figure 2:
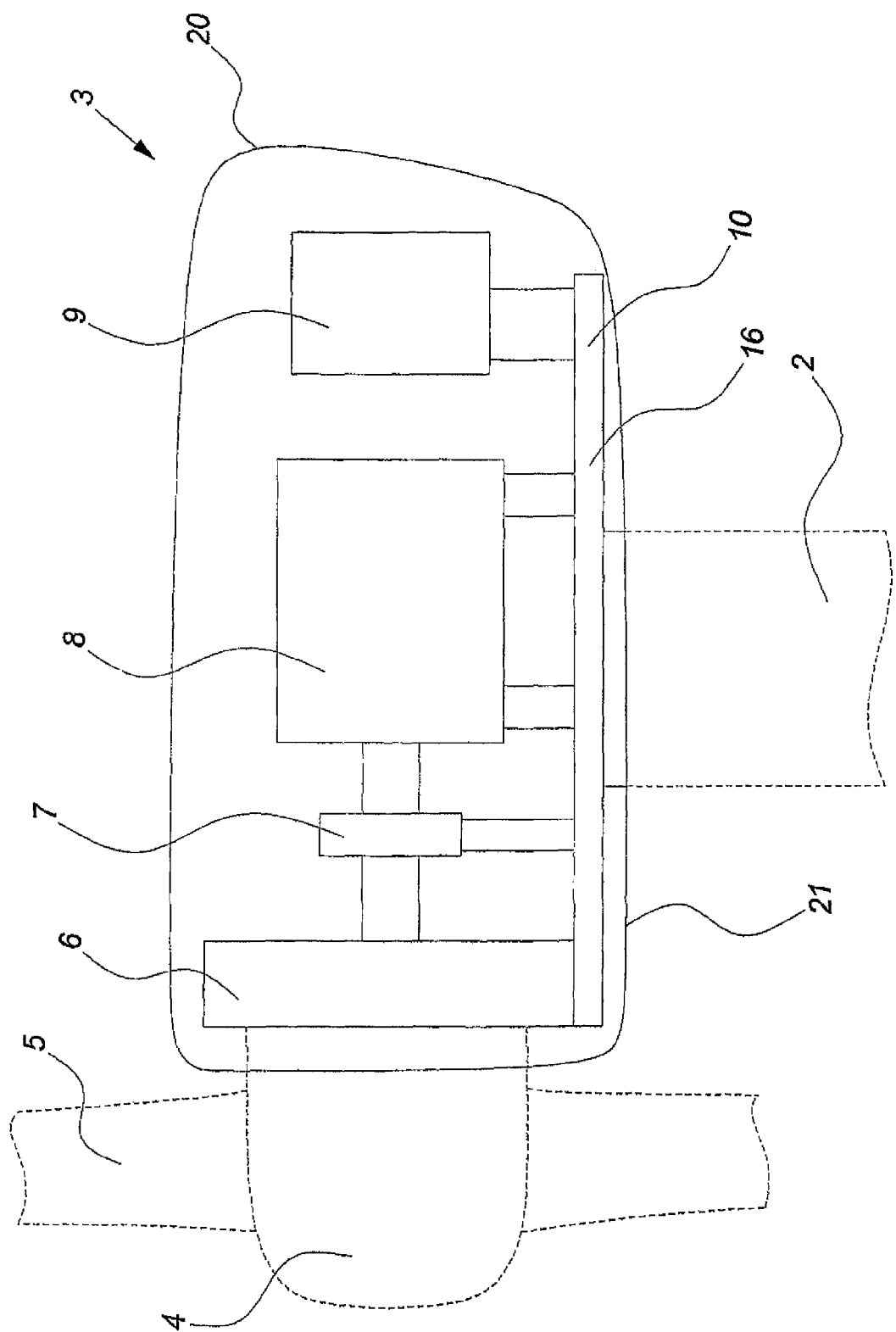
FIG. 2 illustrates a simplified cross section of a nacelle, as seen from the side.

FIG. 2 illustrates a simplified cross section of a nacelle 3, as seen from the side. Nacelles exists in a multitude of variations and configurations but three components are almost always present in the nacelle 3—namely a gear 6, some sort of breaking system 7 and a generator 8. A nacelle 3 of a modern wind turbine 1 often further include an inverter 9 and additional peripheral equipment such as further power handling equipment, control cupboards, hydraulic systems, cooling systems and more.

The weight of the entire nacelle 3 including the nacelle components 6, 7, 8, 9 is carried by a load carrying structure 10. The components 6, 7, 8, 9 are usually placed on and/or connected to this common load carrying structure 10. In this embodiment of the invention the load carrying structure 10 comprise a bottom structure 16 placed at the bottom of the nacelle 3 to which some or all the components 6, 7, 8, 9 are connected. This bottom structure 16 could e.g. be a bed frame substantially constituting the floor of the nacelle 3.

Figure 3:
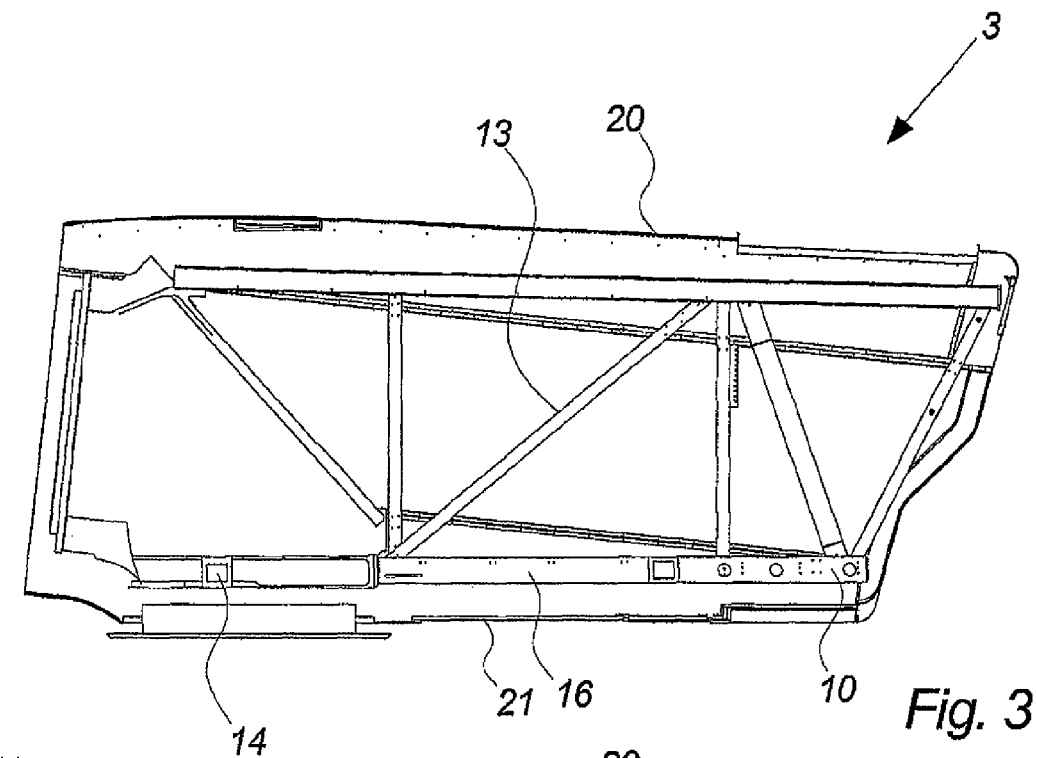
FIG. 3 illustrates an embodiment of a load carrying structure of a nacelle, as seen from the side.

FIG. 3 illustrates an embodiment of a load carrying structure 10 of a nacelle 3, as seen from the side.

In this embodiment of the invention the load carrying structure 10 comprise a bottom structure 16 at or very close to the face of the nacelle 3 facing the ground during normal handling, transport and operation of the nacelle 3. The bottom structure 16 substantially extends in the entire length and width of the nacelle 3 and it could e.g. be or include a e.g. in form of a bed frame. The bottom structure 16 is in this embodiment made by a number of plates and beams welded together to form a strong an rigid surface of the nacelle 3 on which the different nacelle components 6, 7, 8, 9 or at least a majority of the nacelle components 6, 7, 8, 9 (e.g. the majority in weight) can be attached typically by means of bolts.

In this embodiment of the invention the load carrying structure 10 further comprise a latticework 13 substantially extending in the entire length and height on both sides 18, 19 of the nacelle 3. The latticeworks 13 comprise a number of typically steel beams bolted or welded together. At the bottom the latticework 13 are rigidly connected to the bottom structure 16 and at the top the latticework 13 could be connected by traverse supporting beams.

The upper beams of the latticework 13 could e.g. be used as rails or rail support for an overhead traveling crane (not shown) for use when installing, repairing or replacing the drive train components 6, 7, 8 or other.

In another embodiment of the invention the bottom structure 16 could constitute the entire load carrying structure 10.

In this embodiment of the invention the load carrying structure 10 comprise four lifting areas 14 in form of four open rectangular tube ends embedded and integrated in the bottom structure 16 and substantially the entire nacelle 3 (excluding the opening through which the hub and the tower 2 extends) is covered with a nacelle cover 20. The cover 20 could in an embodiment of the invention be a part of the load carrying structure 10 but usually the cover 20 are made of thin plates with substantially no supporting or load carrying ability. The primary object of the cover 20 is usually to provide shelter for the equipment placed inside the nacelle 3 hereby protecting the equipment from rain, snow etc.

Figure 4:
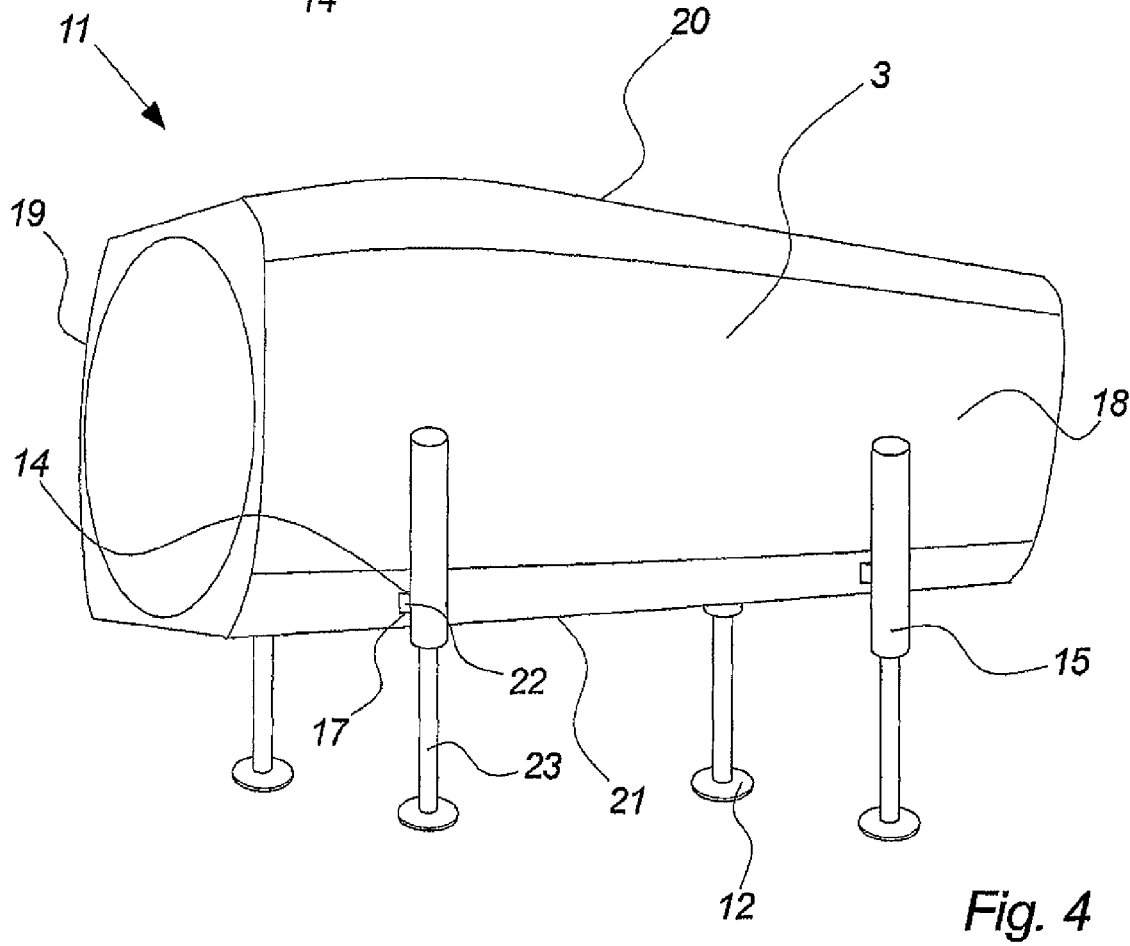
FIG. 4 illustrates a simplified cross section of a nacelle, as seen from the side.

FIG. 4 illustrates a simplified cross section of a nacelle 3, as seen from the side.

In this embodiment of the invention the nacelle cover 20 comprise four handling openings 17 placed with two openings 17 on a first longitudinal side 18 of the nacelle 3 and two further openings 17 on the second longitudinal side 19. The handling openings 17 on the first longitudinal side 18 are in this embodiment placed substantially directly opposite the openings 17 on the second longitudinal side 19, positioning the handling openings 17 substantially symmetrically around a vertical plane passing through the center of the nacelle 3 in the longitudinal direction.

The handling openings 17 in the nacelle cover 20 provide access from the outside to the load carrying structure 10 inside the nacelle 3, hereby providing access for four lifting means 15 to lifting areas 14 of the load carrying structure 10 inside the nacelle 3.

In this embodiment of the invention the lifting means are formed as hydraulic cylinders provided with an engaging member 22 extending substantially vertically from the cylinder housing. The cylinder piston 23 is provided with a plate 12 or the like at the end pressing against the ground to distribute the load over a larger area.

In another embodiment of the invention the nacelle 3 could comprise another number of handling openings 17 and lifting areas 14, such as two, three, six or other and the openings 17 and lifting areas 14 could be placed differently such as one on each side of the nacelle 3 close to front of the nacelle 3 and then a third placed at the middle of the rear side or the openings 17 and lifting areas 14 could be placed on the bottom face of the nacelle making the lifting means 15 engage the load carrying structure 10 from the bottom and up.

Figure 5:
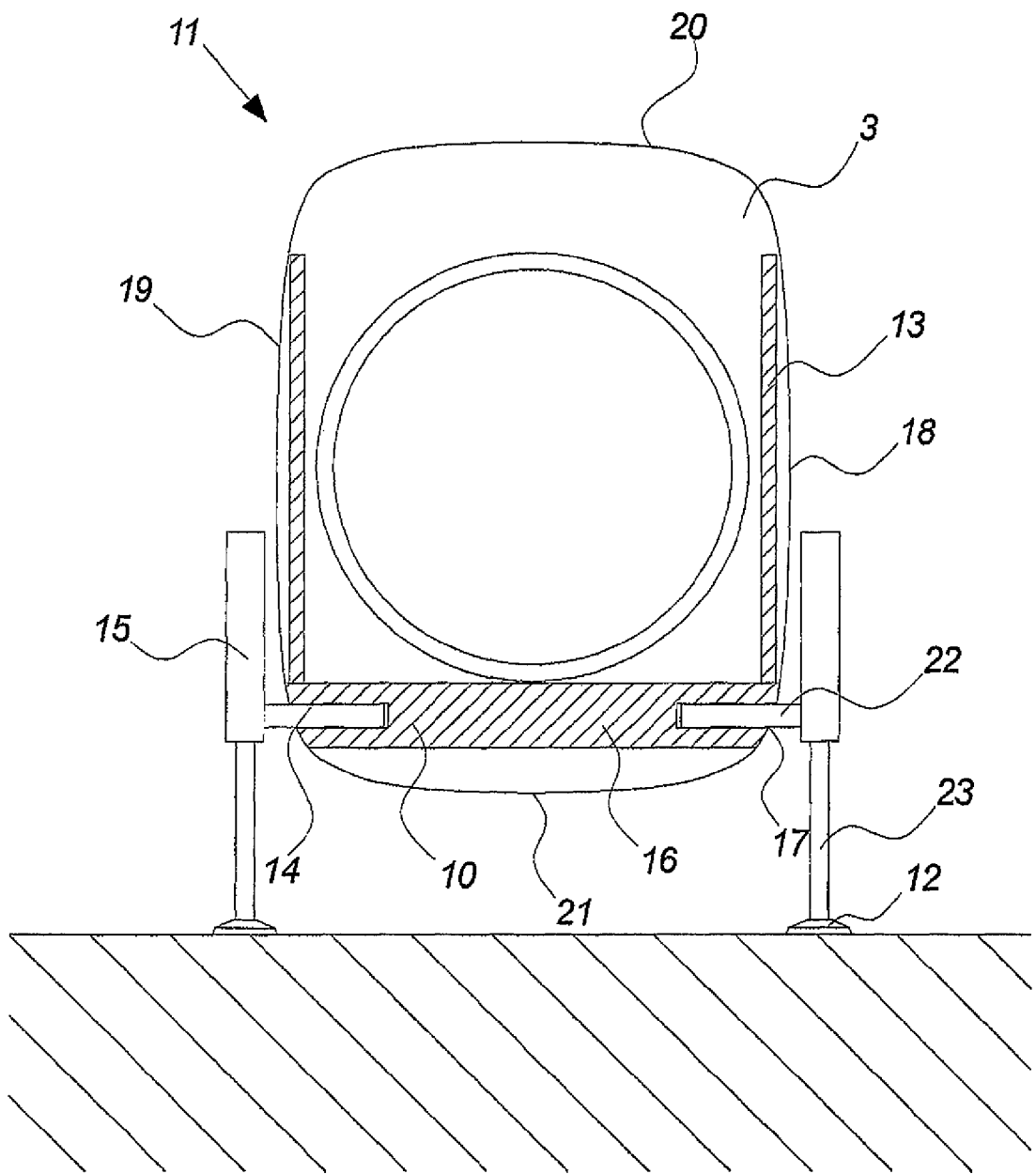
FIG. 5 illustrates a cross section of a nacelle comprising lifting means, as seen from the rear.

FIG. 5 illustrates a cross section of a nacelle 3 comprising lifting means 15, as seen from the rear.

In this embodiment of the invention the lifting means 15 engage the bottom structure 16 of the load carrying structure 10 by means of engaging members 22 of the lifting means 15 being placed through the handling openings 17 and into corresponding cavities forming the lifting areas 14.

In this embodiment of the invention the engaging member 22 is formed as a rectangular tube and the lifting area 14 are formed as a corresponding hole. By making the engaging member 22 formed as a rectangular tube relatively close fit the lifting area 14 it is ensured that the lifting means 15 can not rotate when engaged, hereby ensuring that the nacelle does not overturn when lifted by the lifting means 15.

In another embodiment of the invention the engaging member 22 and the corresponding lifting area 14 could be formed differently, the engaging member 22 or another part of the lifting means 15 could be attached to the lifting area 14 e.g. by means of bolts or the lifting means 15 could push directly up against a lifting area 14 on the underside of the bottom structure 16.

In this embodiment of the invention the lifting means 15 are formed as hydraulic cylinders but in another embodiment the lifting means could be formed as screw jacks, some sort of jawtongs mechanism, another type of linear actuators such as a motor or manually driven spindle and spindle nut system, pneumatic actuators or other.

A handling system 11 according to the invention can e.g. be used for self-loading and unloading of the nacelle 3 from a vehicle. A nacelle 3 placed on the ground or on some kind of temporary storage frame could be provided with lifting means 15 by placing the engaging members 22 of a number of lifting means 15 so that they engage with the lifting areas 14 of the nacelle 3 or in another way make the lifting means 15 engage with the lifting areas 14. The lifting means 15 are the activated e.g. by pumping hydraulic oil into hydraulic cylinders of the lifting means 15 hereby pushing pistons 23 of the lifting means 15 out and increasing the vertical extend of the lifting mans 15 whereby the nacelle 3 is lifted substantially vertically.

While the lifting means 15 maintains the nacelle 3 in a stationary elevated position, the nacelle 3 can then be attached to a truck in one end and a trailer in the other end, after which the lifting means 15 are retracted again so that they can be easily removed e.g. during transport.

The lifting means 15 could also lift the nacelle 3 so high that a trailer could be placed under the nacelle 3, so that when the nacelle 3 is lowered again it is positioned on the platform body of the trailer ready to be transported.

Figure 6:
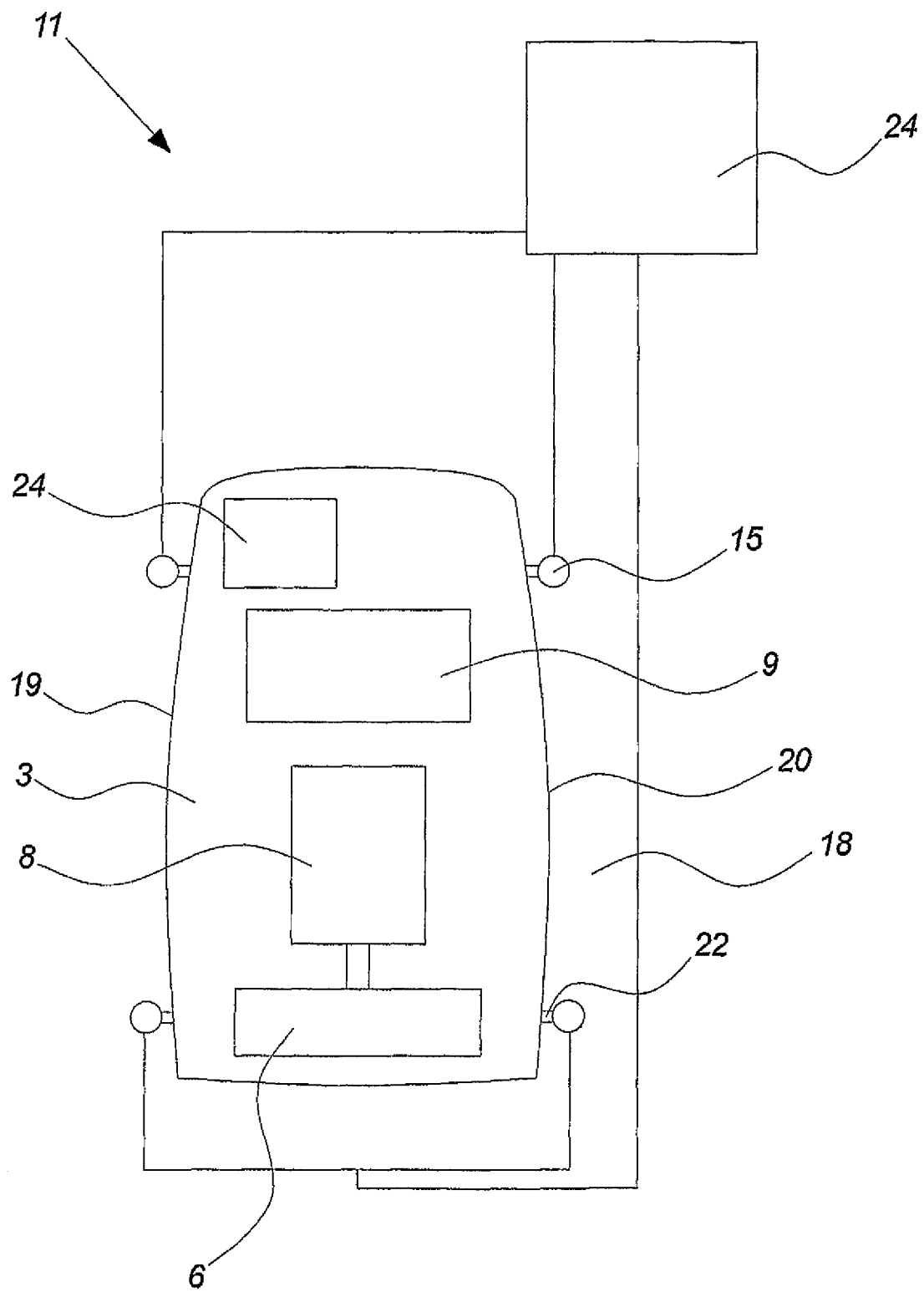
FIG. 6 illustrates a handling system comprising lifting means connected to a common oil pump, as seen from above.

FIG. 6 illustrates a handling system 11 comprising lifting means connected to a common oil pump 24, as seen from above.

In this embodiment of the invention four symmetrically positioned lifting means 15 in the form of hydraulic cylinders are attached to the longitudinal sides 18, 19 of the nacelle 3. The two cylinders 15 placed on either sides 18, 19 closest to the rear of the nacelle 3 are each individually connected to a oil pump making it possible to adjust the vertical extend of the two cylinders independent from each other and all other cylinders 15.

The two cylinders 15 at the front of the nacelle 3 are connected to the same output of the oil pump 24 making these two cylinders 15 extend equally when pressurized.

In another embodiment of the invention the cylinders 15 could be connected to the oil pump 24 in another configuration such as connecting all the cylinders 15 individually, connecting all the cylinders to the same output of the oil pump making all the cylinders 15 extend uniformly when activated or other.

In this embodiment of the invention the oil pump 24 is an independent unit placed outside the nacelle 3 but the nacelle 3 is often provided with its own oil pump 24 so in another embodiment the lifting means could be connected to the nacelle oil pump or they could be connected to an oil pump of a truck or another vehicle transporting the nacelle 3.

The invention has been exemplified above with reference to specific examples of handling systems 11, nacelles 3, lifting means 15 and other. However, it should be understood that the invention is not limited to the particular examples described above but may be designed and altered in a multitude of varieties within the scope of the invention as specified in the claims.

LIST

1. Wind turbine
2. Tower
3. Nacelle
4. Rotor
5. Blade
6. Gear
7. Brake system
8. Generator
9. Inverter
10. Load carrying structure
11. Handling system
12. Plate
13. Latticework
14. Lifting area
15. Lifting means
16. Bottom structure
17. Handling openings
18. First longitudinal side
19. Second longitudinal side
20. Nacelle cover
21. Bottom face
22. Engaging member
23. Piston
24. Oil pump

The invention claimed is:

1. A wind turbine nacelle handling system for use in connection with self-loading or unloading of a nacelle, the handling system comprising:
    a wind turbine nacelle with a load carrying structure configured for carrying the weight of said nacelle and nacelle components mounted in said nacelle; and
    two or more lifting devices detachably engaged with lifting areas integrated in a bottom structure of said load carrying structure of said nacelle,
    wherein said lifting devices are arranged to lift said nacelle by applying linear force to said load carrying structure of said nacelle.

2. The handling system according to claim 1, wherein said handling system comprise at least three individual adjustable lifting devices.

3. The handling system according to claim 1, wherein said two or more lifting devices comprise a device for vertical displacement of said lifting areas.

4. The handling system according to claim 1, wherein said two or more lifting devices comprise one or more hydraulic cylinders each.

5. The handling system according to claim 1, wherein said lifting areas are positioned substantially symmetrically on or in said load carrying structure.

6. The handling system according to claim 1, wherein said nacelle includes longitudinal sides and said lifting areas are established in the longitudinal sides of said nacelle.

7. The handling system according to claim 1, wherein said lifting areas are established in relation to the weight distribution of said nacelle providing substantially uniform load on each of said two or more lifting devices when self-loading or self-unloading.

8. The handling system according to claim 1, wherein said two or more lifting devices comprise engaging members being engaged with said lifting areas, said engaging members comprising devices for transferring torque to said lifting areas in a longitudinal direction of said nacelle.

9. A method for vertical displacement of a wind turbine nacelle comprising a load carrying structure configured for carrying the weight of the nacelle and nacelle components mounted in the nacelle, the method comprising:
   engaging two or more lifting devices with lifting areas integrated in a bottom structure of the load carrying structure of the nacelle; and
   vertically displacing the nacelle by applying linear force to the load carrying structure of the nacelle with the lifting devices.

10. The method according to claim 9, wherein the two or more lifting devices comprise at least three individual adjustable lifting devices engaging at least three separate lifting areas.

11. The method according to claim 10, wherein the lifting devices are hydraulic cylinders vertically displacing the nacelle substantially proportional with the extension or extraction of a piston of the hydraulic cylinders.

12. The method according to claim 9, wherein the method further comprises:
   placing a transport vehicle underneath the nacelle when the two or more lifting devices have lifted the nacelle free of an underlying surface.

13. The method according to claim 12, wherein the method further comprises:
   retracting the two or more lifting devices when the transport vehicle is placed underneath the nacelle to place the nacelle on the transport vehicle.

14. The method according to claim 13, wherein the method further comprises:
   detaching at least one of the two or more lifting devices from the nacelle when the nacelle is placed on the transport vehicle.

15. A wind turbine nacelle prepared for self-loading or unloading to or from a vehicle, the nacelle comprising:
   a nacelle cover defining first and second longitudinal sides;
   a load carrying structure configured for carrying the weight of the nacelle and nacelle components mounted in the nacelle; and
   handling openings in the nacelle cover for establishing exterior access to lifting areas integrated in a bottom structure of the load carrying structure for lifting, and the handling openings being established in the longitudinal sides.

16. The wind turbine nacelle according to claim 15, wherein the first longitudinal side comprises at least one handling opening and the second longitudinal side comprises at least one further handling opening.

17. The wind turbine nacelle according to claim 16, wherein the handling openings in the first longitudinal side and the further handling openings in the second longitudinal side are positioned substantially directly opposite each other.

* * * * *